United States Patent [19]

Saito

[11] 4,316,661
[45] Feb. 23, 1982

[54] ELECTROMAGNETICALLY OPERATED SHUTTER

[75] Inventor: Syuichiro Saito, Kawasaki, Japan

[73] Assignee: Canon Kabushiki Kaisha, Tokyo, Japan

[21] Appl. No.: 147,299

[22] Filed: May 6, 1980

[30] Foreign Application Priority Data

May 10, 1979 [JP] Japan .................................. 54/57479

[51] Int. Cl.³ .............................................. G03B 9/08
[52] U.S. Cl. .................................. 354/234; 354/246; 354/248; 354/249
[58] Field of Search ............... 354/234, 235, 245, 246, 354/247, 248, 249, 264, 265, 266

[56] References Cited

U.S. PATENT DOCUMENTS 3,672,282  6/1972  Yamada ................................ 354/246
3,724,350  4/1973  Mielke ................................. 354/234

Primary Examiner—Russell E. Adams
Attorney, Agent, or Firm—Toren, McGeady & Stanger

[57] ABSTRACT

In a slit shutter such as a focal plane shutter of the two blade type, the shutter blades and electrically operated magnetic drive means therefor are arranged on opposite sides of respective rotatable transmission means with respect to the axes thereof and are coupled therewith respectively to be movable in opposite directions relative to each other, whereby the possibility of a shock producing effect in the shutter is reduced at the time of actuation thereof.

4 Claims, 10 Drawing Figures

ELECTROMAGNETICALLY OPERATED SHUTTER

BACKGROUND OF THE INVENTION

This invention relates to electromagnetically operated slit shutters.

Conventionally, shutters for controlling the exposure of photographic material in cameras have made use of drive mechanisms which are powered by mechanical biasing means such as springs to drive the shutter blades (or shutter curtains) in one direction. Such conventional type shutter drive mechanisms necessitate the provision of cocking means arranged after the termination of exposure to return the shutter blades to the initial position while tensioning the springs, thus preparing for the next exposure. The addition of the resetting mechanism makes the entire system complicated and increases the necessary number of constituent parts with the disadvantage that as the scale and complexity of the equipment for assembling and production is increased, it becomes difficult to achieve a minimization of the production cost.

To eliminate the above-described problems of the spring-powered shutter drive mechanism and, moreover, to obtain a shutter of higher accuracy and better quality than those of the above-described shutter, it has been proposed to make use of an electrically operated magnetic control device in controlling the opening and closing movement of the shutter blades.

The arrangements to these devices may be classified into the following three main groups:

(1) A mechanism wherein a coil or other suitable conductor is arranged in the magnetic field of a permanent magnet which, upon passage of current therethrough, causes the coil to move, thus providing a so-called moving coil type drive control mechanism.

(2) A mechanism wherein a magnetic member such as an iron rod is arranged in a space within a coil or other suitable conductor so that upon passage of current through the coil this member is moved as the magnetic resistance is changed, thus providing a so-called plunger type drive control mechanism.

(3) A mechanism wherein a permanent magnet and a plurality of coils constitute a linear motor type drive control mechanism.

The above-described three arrangements have a common feature that either the coil, or the iron plunger is driven to move, and this motion is transmitted to the shutter blades through a linkage or the like. Therefore, the sum of the weights of the coil or iron plunger, the linkage and other associated moving parts becomes heavier than that of the weights of the moving parts of the spring-powered shutter drive mechanism, so that when the shutter is released, it tends to strike on the stop member thereby causing of a shock of significant magnitude, which shock causes vibrations in the camera.

Another disadvantage is that since the mating pattern of the relatively heavy coil or iron plunger with the shutter blades is improper, the conventional mechanism is susceptible to the influence of gravity (gravitational pulling effect) and the shutter speed setting is apt to change its value by a magnitude depending upon the attitude of the camera.

The present invention has for its general object to provide an electromagnetically operated shutter in which an significantly reduced force is sufficient for driving the shutter blades, whereby the magnitude of shock resulting from the stoppage of the running down shutter blade is minimized to prevent introduction of vibrations to the camera.

To achieve this, according to the present invention, the shutter blades and the moving parts of the electrically operated magnetic control device are drivingly connected to each other by pivoted members, and the arrangement of these parts is such that each shutter blade and the moving part of the drive means therefor are moved in opposite directions to each other in symmetry with respect to the axis of the rotating link member.

This arrangement enables the shutter blades and drive means to be balanced in weight by the link members in all stations of movement thereof, thus making it possible to control the movement of the shutter blades with relatively smaller power requirements, and to significantly improve the reliability of the shutter speed control which would be otherwise dependent upon the attitude of the camera.

The present invention will next be described in greater detail in connection with embodiments thereof by reference to the drawings.

DESCRIPTION OF THE PREFERRED EMBODIMENTS

Figure 1:
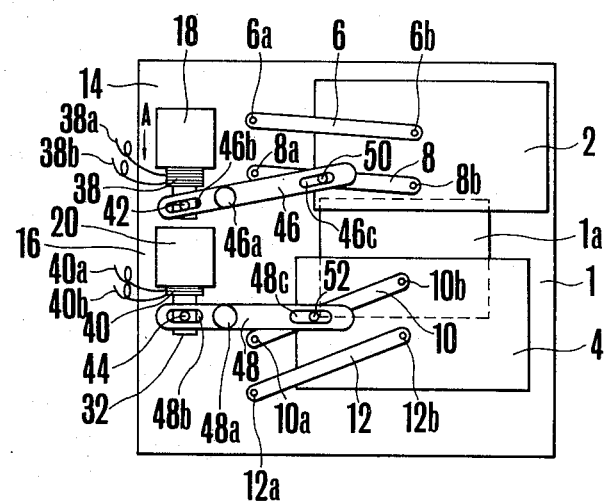
FIG. 1 is a plan view of the main parts of a first embodiment of the present invention.
Figure 2:
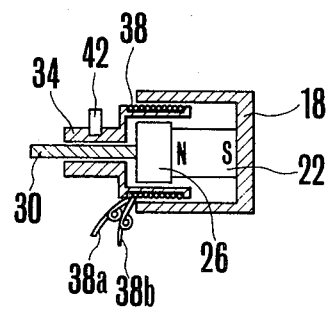
FIG. 2 is a sectional view showing the details of the electrically operated magnetic control device of FIG. 1.

In FIGS. 1 and 2, a shutter support plate 1 is fixedly mounted on a framework (not shown) of a camera body in a suitable place so that light entering through an objective lens (not shown) passes through a rectangular opening 1a in the support plate 1 to photographic material (not shown) at a focal plane (film plane). Leading and trailing shutter blades 2 and 4 are arranged on the front surface of the plate 1 to open and close the film gate 1a and they are shown to assume an intermediate operative position while forming a slit between the borders thereof.

Arm members 6 and 8 constitute a link mechanism for driving the leading shutter blade 2 to move, and arm members 10 and 12 constitute a second link mechanism for driving the trailing shutter blade 4 to move. These members 6, 8, 10 and 12 are pivotally mounted on the support plate 1 at one of the ends thereof by pins 6a, 8a, 10a and 12a, the opposite ends of which bear the leading and trailing blades 2 and 4 through respective pivot pins 6b, 8b, 10b and 12b.

A first electrically operated magnetic control device for controlling the opening and closing movement of the leading blade 2 is indicated at 14, and a second device for controlling the opening and closing movement of the trailing blade 4 is indicated at 16. The details of the construction of the first and second devices are shown in FIG. 2 where the same reference characters have been employed to denote parts similar to those shown in FIG. 1. Since the first and second electromagnetic devices 14 and 16 are similar in construction to each other, only the first device is shown, but the reference characters for the parts of the second device are herein referred to in parentheses. Reference numerals 18 (20) refer to a cover constituting part of a magnetic circuit with a permanent magnet piece 22 (24 not shown) contained in the interior thereof, and made of pure iron or other suitable yoke material. Symbols N and S denote the north and south poles of the magnet 22, with the south end in contact with the bottom of the cover 18 and with the north end fixedly carrying a pole piece 26 (28) on which a guide shaft 30 (32) is mounted. Axially movably mounted on the guide shaft 30 (32) is a bobbin 34 (36) around which a coil 38 (40) is wound. The ends 38a and 38b of the coil 38 (40) are connected to a drive control circuit (not shown). A pin 42 (44) extends radially from the bobbin 34 (36). The cover 18, permanent magnet 22, pole piece 26 and guide shaft 30 form a stationary portion of the device, while the bobbin 34, coil 38 and pin 42 form a movable portion thereof.

Turning to FIG. 1 again, pivoted levers 46 and 48 for transmitting motion of the first and second electromagnetic devices 14 and 16 to the shutter blades 2 and 4 respectively are movably mounted on pivot pins 46a and 48a near the centers thereof, the pins 46a and 48a normally extending from the support plate 1. The levers 46 and 48 each have elongated holes 46b and 48b in one end portion thereof through which the pins 42 and 44 on the bobbins 34 and 36 extend respectively, and other elongated holes 46c and 48c at the opposite ends thereof in which are guided bolts 50 and 52 fixed on the arm members 8 and 10 respectively.

In FIG. 2, the magnet 22, pole piece 26 and cover 18 form a magnetic path so that when the coil 38 is supplied with current from the drive circuit through the leads 38a and 38b, a force is exerted in a direction perpendicular both to the direction of current flow and to the direction of the magnetic flux according to Fleming's left hand law to cause movement of the bobbin 34 (36) in a direction indicated by arrow A.

The operation of the shutter of FIG. 1 proceeds so that before the camera is actuated from the cocked position, the leading shutter blade 2 closes the film gate 1a so that the light from the objective lens is blocked from reaching the film, while the trailing blade 4 is retracted from the film gate 1a. The blades 2 and 4 press themselves against the support plate 1 so that they hold themselves against movement under the action of weak frictional forces produced thereby. Then, when a shutter release button on the camera housing is depressed, the drive circuit is rendered operative to energize the coil 38, whereupon the bobbin 34 is driven to move in direction A. Such motion is transmitted through the pin 42 and elongated hole 46a to turn the transmission lever 46 about the axis 46a in a counterclockwise direction. Such movement of the lever 46 in turn causes the arm member 8 bearing the leading blade 2 to be turned about the axis 8a in a counterclockwise direction through the bolt 50 and elongated hole 46c, thus moving the leading blade 2 away from the film gate 1a, and initiating an exposure.

After a predetermined exposure time has passed, the drive circuit energizes the second coil 40, whereupon the bobbin 36 is driven to move. This causes the transmission lever 48 to be turned about the axis 48a in a counterclockwise direction which in turn causes the trailing blade 4 to be moved to the light blocking position over the film gate 1a.

After the exposure has thus been completed, the direction of current flowing through each of the coils 38 and 40 is reversed, causing the moving parts of the first and second electromagnetic devices 14 and 16 to return to their initial positions, while moving the leading and trailing blades 2 and 4 in light tight engagement with each other to the initial positions.

It will be appreciated that since, in this embodiment, the driving connection from the moving parts 34, 38, 36, 40 of the electromagnetic means 14, 16 to the shutter blades 2, 4 includes motion transmitting means in the form of levers 46, 48, the moving parts of the electromagnetic means and the shutter blades can be arranged to travel in the opposite directions whereby the driving torque is largely reduced as the weight of the drive means is balanced by the weight of the shutter blades. Thus, the possibility of vibrations at the time of actuation of the shutter is limited to a very small value, and the magnitude of the shock itself is largely reduced by balancing simultaneous shocks of opposite direction with each other with the advantage that no camera vibrations occur.

Figure 3:
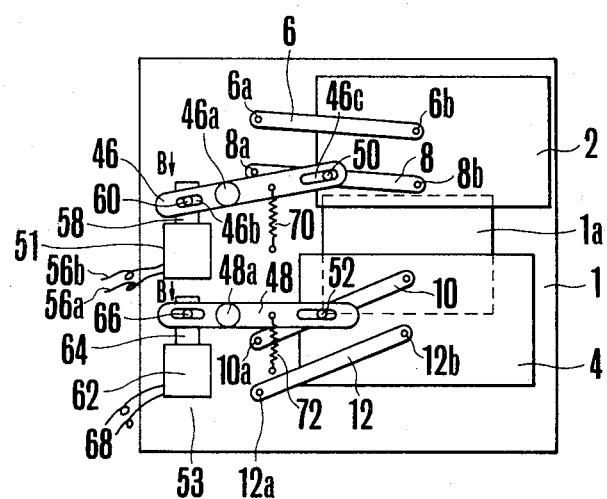
FIG. 3 is a plan view of the main parts of a second embodiment of the present invention.
Figure 4:
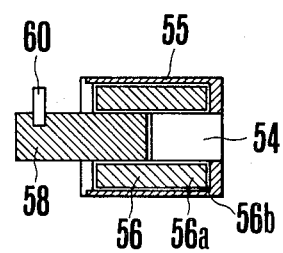
FIG. 4 is a sectional view showing the details of the electrically operated magnetic control device of FIG. 3.

FIGS. 3 and 4 show an embodiment of a plunger type electromagnetically operated shutter, where the same reference characters have been employed to denote parts similar to those shown in FIGS. 1 and 2. Reference numerals 51 and 53 denote respectively leading and trailing shutter blade drive power sources or electrically operated magnetic devices of the plunger type. Since the devices for the leading and trailing blades are similar in construction, only one of the devices 51 is shown in FIG. 4. A cylindrical tube body 55 contains a permanent magnet 54 in fixedly secured relation thereto, and a coil 56 in a predetermined air-spaced relation to the interior surface of the tube body 55. The coil 56 has two lead wires 56a and 56b connected to a drive circuit (not shown). An iron plunger 58 is movably arranged in a space surrounded by the coil 56, and fixedly carries a pin 60 which extends through the elongated hole 46b of the transmission lever 46.

The second device 53 comprises a casing 62, an iron plunger 64, a pin 66, and a coil with lead wires 68 connected to the circuit (not shown).

In this embodiment, the transmission levers 46 and 48 are urged in one direction by biasing means such as springs 70 and 72.

In operating the shutter of FIGS. 3 and 4, when a shutter release signal is applied to the drive circuit (not shown), the first device 51 is selectively actuated with the iron plunger 58 moving in a direction indicated by arrow B. Such movement of the plunger 58 causes counterclockwise movement of the transmission lever 46 about the axis 46a which is transmitted through the arm member 8 to move the leading shutter blade 2 away from its position blocking the aperture 1a, thus initiating an exposure. After the exposure time has passed, the coil 68 in the second device 52 is supplied with current from the drive circuit (not shown), whereby the iron plunger 64 is moved. Motion of the plunger 64 is transmitted through the lever 48 and arm member 10 to move the trailing shutter blade 4 into a position closing the aperture 1a. After the completion of the exposure, the current supply to the coils 56 and 58 is cut off, and the forces on the plungers 58 and 64 disappear simultaneously. Then, the transmission levers 46 and 48 are turned clockwise by the forces of the return springs 70 and 72, thus resetting the shutter blades 2 and 4 in the initial positions.

Figure 5:
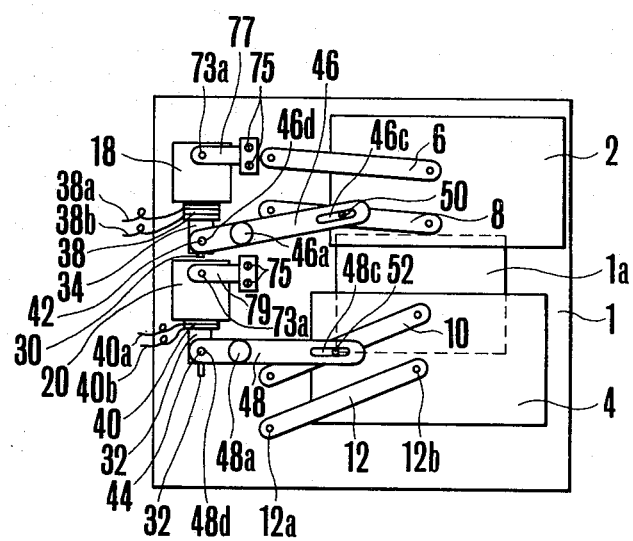
FIG. 5 is a plan view of the main parts of a third embodiment of the present invention.
Figure 6:
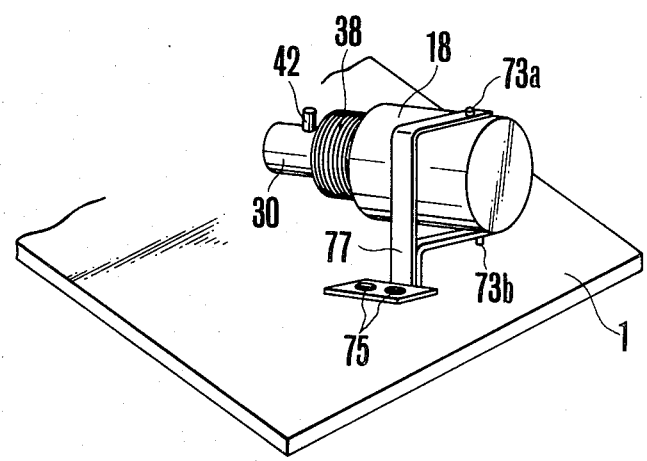
FIG. 6 is a perspective view of the electromagnetic device of FIG. 5.

FIGS. 5 and 6 show an example of improvement of the embodiment of FIGS. 1 and 2. In connection with the first and second drive source devices 14 and 16 of FIG. 1, it should be pointed out that since the arrangement of the pins 42 and 44 on the bobbins 34 and 36 in slidingly movable relation to the edges of the elongated holes 46b and 48b of the transmission levers 46 and 48 gives rise to the production of a frictional force between the pins 42 and 44 and the elongated holes 46b and 48b as the bobbins 34 and 36 move with current supply to the coils 38 and 40, some loss in the energy due to the frictional engagement between the pins 42 and 44 and the transmission levers 46 and 48 is responsible for a considerable reduction in the response characteristics of the shutter blades 2 and 4 to the signals from the drive circuit (not shown). Therefore the shutter of FIGS. 1 and 2 leaves room for improving the accuracy of shutter control. On this account, the shutter of FIGS. 5 and 6 is aimed to reduce the friction between the drive source and the transmission lever to as small a value as possible, where the same reference characters have been employed to denote parts similar to those shown in FIGS. 1 and 2.

As shown in FIG. 6, each of the first and second electromagnetic means 14 and 16 is pivotally mounted on the support plate 1 by a pair of pins 73a and 73b through a bracket member 77 or 79 which is fixed to the support plate 1 by screw fasteners 75. Again, the pins 42 and 44 are movably fitted in round holes 46d and 48d provided in the transmission levers 46 and 48.

With such construction, when either or both of the electromagnetic means 14 and 16 is or are moving their bobbins in driving connection with the shutter blades 2 and 4 through the motion transmitting levers 46 and 48, the covers 18 and 20 of the electromagnetic means are turned about the pivot pins 73a and 73b as the levers 46 and 48 turn, thus absorbing the angular thrust therebetween at the pivotal connections of the pins 42 and 44 with the levers 46 and 48, and ensuring a smooth operation of the shutter with the limitation of the friction to a minimum.

Figure 7:
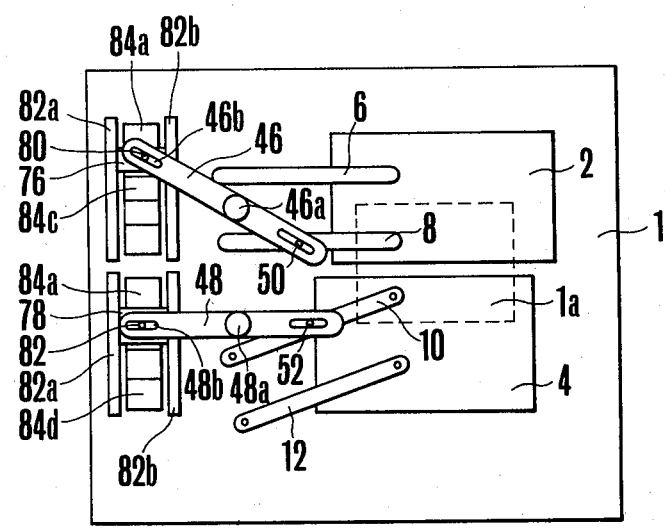
FIG. 7 is a plan view of the main parts of a fourth embodiment of the present invention.
Figure 8:
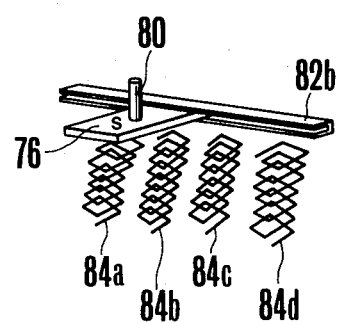
FIG. 8 is a schematic fragmentary perspective view of the electromagnetic device of FIG. 7.

FIGS. 7 and 8 show another embodiment of the invention where the electromagnetic device is constructed in the form of a linear motor. In the figures, the shutter blades 2 and 4, the arm members 6 to 12, and transmission levers 46 and 48 of FIG. 1 are applied with no further modification. Permanent magnets 76 and 78 fixedly carry normally extending pins 80 and 82 which extend through the respective elongated holes 46b and 48b of the transmission levers 46 and 48, and are guided by guide rails 82a and 82b to be linearly movable, the rails being fixedly mounted on the support plate 1. A plurality of coils 84a, 84b, 84c, . . . are positioned in a row underneath the path of movement of each of the permanent magnets 76 and 78.

With this linear motor, when a drive control circuit (not shown) supplies current to the coils 84a, 84b, 84c, . . . successively, they produce magnetic fields of opposite polarity to that of the permanent magnet 76 (south pole under) one at a time from one terminal end to the other so that the permanent magnet 76 is driven by attractive force to move. That is, when the permanent magnet 76 arrives at a point just above the coil 84b, for example, the current supply to that coil 84b is cut off, and instead switched to the next coil 84c, whereby the permanent magnet 76 is caused to proceed to the further point just above the coil 84c, and so on. Motion of the permanent magnet is transmitted through the connection of pin 80 and hole 82 to turn the lever 46 or 48 in a counterclockwise direction, and further therefrom through the arm member 8 or 10 to move the shutter blade 2 or 4.

Figure 9:
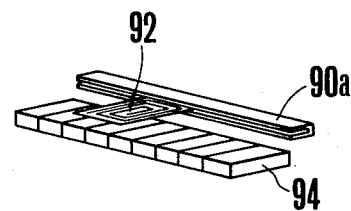
FIG. 9 is a perspective view of another example of an electromagnetic device.
Figure 10:
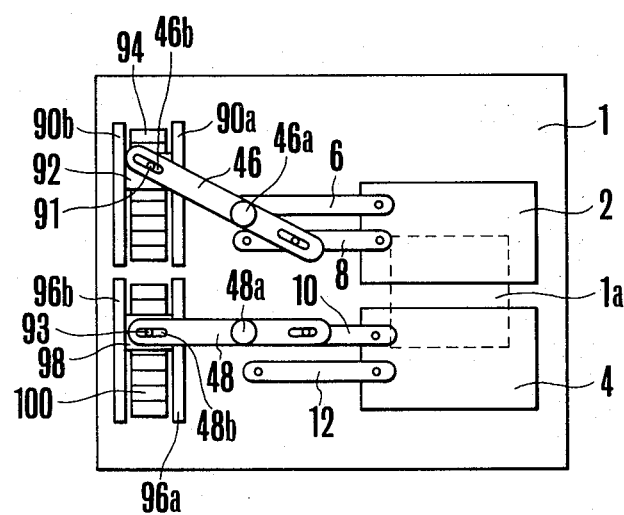
FIG. 10 is a plan view of a fifth embodiment of the present invention employing the device of FIG. 9.

FIGS. 9 and 10 show an example of variation of the linear motor of FIGS. 7 and 8. As shown in FIG. 9, a great number of permanent magnet elements are positioned in a row with their north and south poles alternating with each other. Arranged above the row of the permanent magnet elements 94 (100) is a single coil 92 (98) to be moved when the direction of current flowing through the coil is changed alternately. The coils 92 and 98 are constructed in a sheet form and are movably mounted on support members 90a, 90b, 96a and 96b for sliding guide. Pins 91 and 93 affixed to the coils 92 and 98 respectively engage in the elongated holes 46b and 48b of the transmission levers 46 and 48 respectively, so that the shutter blades 2 and 4 are moved in response to movement of the coils 92 and 98.

While specific embodiments of the invention have been shown and described in detail to illustrate the application of the inventive principles, it will be understood that the invention may be embodied otherwise without departing from such principles.

What is claimed is:

1. An electromagnetically operated shutter comprising:
   (a) leading and trailing shutter blades;
   (b) electromagnetic drive means for said leading shutter blade;
   (c) electromagnetic drive means for said trailing shutter blade; and
   (d) driving force transmitting means arranged between said shutter blades and said electromagnetic drive means to transmit the driving force of said drive means to said shutter blades;
   whereby said driving force transmitting means are pivotally mounted with their ends on opposite sides of their respective pivot axes, said transmitting means being operatively connected to said electromagnetic drive means and said shutter blades respectively so that said drive means and said shutter blades are caused to move in opposite directions to each other, said driving force transmitting means being constructed in the form of levers having their ends engaging respective moving parts of said electromagnetic drive means in rotatably fitted relation to each other, said electromagnetic drive means being supported in such a manner that they turn about respective pivot axes as said transmitting means are turned.

2. An electromagnetically operated shutter assembly comprising: first and second shutter blade means for selectively opening and closing a light transmitting aperture; first and second electromagnetic drive means each including movable components electromagnetically actuated to drive said first and second shutter blade means, respectively; and transmission means operatively interposed between said electromagnetic drive means and said shutter blade means to transmit driving forces therebetween; said transmission means comprising pivoted lever means having first and second ends and mounted for pivotal movement about pivot axis means intermediate said ends, said pivoted lever means being connected at said first ends to said movable components of said electromagnetic means and at said second ends to said shutter blade means to interconnect said movable components and said shutter blade means for movement relative to each other in opposed directions, said first and second electromagnetic drive means being mounted for pivotal movement about an axis extending generally parallel to said pivot axis means and fixed relative thereto.

3. An electromagnetically operated shutter comprising:
   leading and trailing shutter blades;
   electromagnetic drive means for said leading shutter blade;
   electromagnetic drive means for said trailing shutter blade; and
   driving force transmitting means arranged between said shutter blades and said electromagnetic drive means to transmit the driving force of said drive means to said shutter blades, said driving force transmitting means being pivotally mounted intermediate the ends thereof;
   said driving force transmitting means being pivotally mounted with their ends on opposite sides of their respective pivot axes, said transmitting means being operatively connected to said electromagnetic drive means and said shutter blades respectively so that said drive means and said shutter blades are caused to move in opposite directions to each other;
   said electromagnetic drive means having a movable portion, with one end of said transmitting means being connected to said movable portion of said electromagnetic drive means in a manner such that said one end can follow the movement of said movable portion in any direction, with the other end of said transmitting means being connected to said leading and trailing shutter blades, respectively, so as to cause said shutter blades to follow said movement in any direction;
   said electromagnetically operated shutter being constructed so that the weight of said shutter blades and the weight of said drive means is balanced despite differences in the attitude of a camera within which said electromagnetically operated shutter is mounted.

4. An electromagnetically operated shutter assembly comprising: first and second shutter blade means for selectively opening and closing a light transmitting aperture; first and second electromagnetic drive means each including movable components electromagnetically actuated to drive said first and second shutter blade means, respectively, and transmission means operatively interposed between said electromagnetic drive means and said shutter blade means to transmit driving forces therebetween; said transmission means comprising pivoted lever means having first and second ends and mounted for pivotal movement about pivot axis means intermediate said ends, said pivoted lever means being connected at said first ends to said movable components of said electromagnetic means and at said second ends to said shutter blade means to interconnect said movable components and said shutter blade means for movement relative to each other in opposed directions; said shutter assembly including pin-and-slot engagement means connecting said first ends of said pivoted lever means to said movable components and said second ends of said pivoted lever means to said shutter blade means to enable both linear and rotative movement therebetween at said connected ends; said shutter assembly operating to balance the weight of said shutter blade means and the weight of said drive means.

* * * * *